(12) United States Patent
Firmin

(10) Patent No.: US 6,446,381 B1
(45) Date of Patent: Sep. 10, 2002

(54) FISHING LURE

(75) Inventor: Herman P. Firmin, Baton Rouge, LA (US)

(73) Assignee: Knight Manufacturing Co., Inc., Tyler, TX (US)

( * ) Notice: Subject to any disclaimer, the term of this patent is extended or adjusted under 35 U.S.C. 154(b) by 0 days.

(21) Appl. No.: 09/885,239

(22) Filed: Jun. 21, 2001

Related U.S. Application Data

(62) Division of application No. 09/534,600, filed on Mar. 27, 2000, which is a division of application No. 09/234,741, filed on Jan. 21, 1999, now Pat. No. 6,063,324.

(51) Int. Cl.[7] ................................................. A01K 85/00
(52) U.S. Cl. ..................................... 43/42.26; 43/42.24
(58) Field of Search ........................... 43/42.24, 42.26, 43/42.27, 42.53

(56) References Cited

U.S. PATENT DOCUMENTS

| | | | | |
|---|---|---|---|---|
| 3,068,604 A | * | 12/1962 | Nyberg | 43/42.24 |
| 3,735,518 A | * | 5/1973 | Kleine | 43/42.24 |
| D231,453 S | * | 4/1974 | Haggard | 43/42.26 |
| 4,317,305 A | | 3/1982 | Firmin | 42/42.24 |
| 4,791,749 A | * | 12/1988 | Stazo | 43/42.24 |
| 5,193,299 A | * | 3/1993 | Correll | 42/42.24 |
| 5,996,271 A | * | 12/1999 | Packer | 42/42.26 |
| 6,058,644 A | * | 5/2000 | Irwin | 43/42.27 |

FOREIGN PATENT DOCUMENTS

| | | | | |
|---|---|---|---|---|
| NO | 80073 | * | 3/1951 | 43/42.26 |

* cited by examiner

*Primary Examiner*—Kurt Rowan
(74) *Attorney, Agent, or Firm*—Charles M. Kaplan

(57) ABSTRACT

A fish lure body has integral gussets that hold protruding fins at a predetermined angle to the lure central axis when the lure is moved through water. Molds and methods of molding soft plastic artificial fishing lures in which air is trapped in a blind cavity in a mold and compressed in such a cavity by molten plastic to a pressure that causes the compressed air to eject the finished lure from the mold when the mold is opened after the molten plastic hardens, and artificial fishing lures molded by such methods.

8 Claims, 4 Drawing Sheets

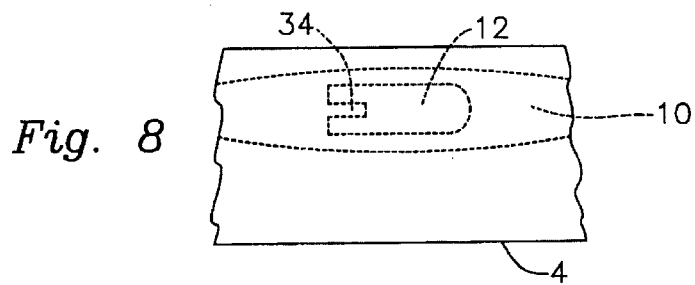
Fig. 8
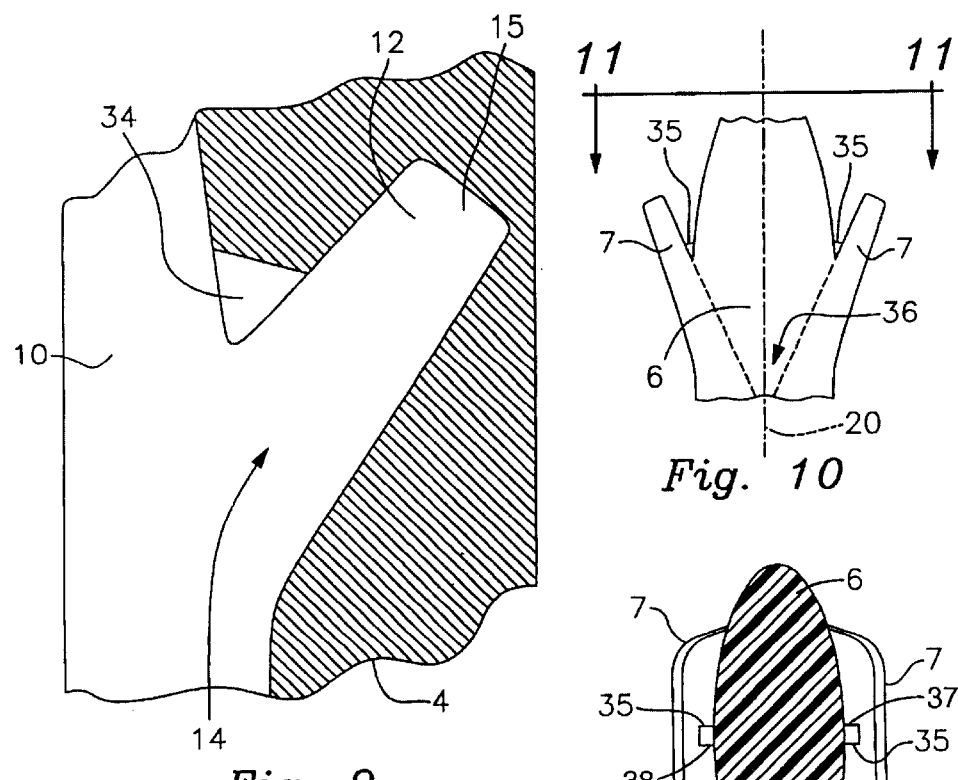
Fig. 9
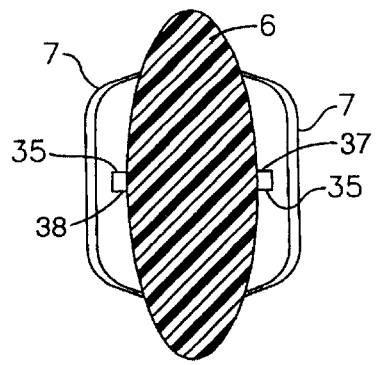
Fig. 10
Fig. 11

FISHING LURE

This application is a division of Ser. No. 09/534,600, which was filed on Mar. 27, 2000, which is a division of Ser. No. 09/234,741, which was filed on Jan. 21, 1999, and is now U.S. Pat. 6,063,324.

BACKGROUND OF THE INVENTION

This invention relates to the manufacture of soft plastic artificial fishing lures, and more particularly to methods of molding such fishing lures. Soft plastic fishing lures have been injection molded with fins or other appendages of the lure projecting at an angle away from the main body of the lure. When such fins or other appendages were molded in closed pockets, the closed pockets were vented to the atmosphere with air escape holes to prevent air from being trapped in the closed pockets. The air vents increased the cost of the molds and wasted plastic which flowed into the vents during the molding process. Separating the lure from the mold after the plastic had hardened was a time consuming task because the lures would stick in the mold cavities and the plastic in the vent holes had to be broken or cut off the lures and removed from the mold halves.

OBJECTIVES OF THE INVENTION

Accordingly, it is an object of this invention to provide improved methods and molds for casting soft plastic fishing lures, and improved lures manufactured by such methods and in such molds.

Another object is to provide molds and methods of casting fishing lures that reduce plastic scrap.

An additional object is to provide artificial fishing lure manufacturing methods and molds that reduce the time workers spend cleaning up and trimming flash and other waste from molded soft plastic lures.

Another object is to provide fish lure molding methods and molds that do not require lubricants or other separating agents for removal of the finished lures from their molds.

Another object is to provide molds and methods of molding fishing lures that automatically loosen the lures and release them from their molds.

Another object is to provide fishing lure manufacturing methods that do not require mold halves with air vent openings.

Another object is to provide soft flexible finned fishing lures with integral gussets that hold the soft flexible fins at the same predetermined angle with the lure central axis when the lures are moved through water.

A further object is to provide relatively low cost, defect-free soft plastic fishing lures made by simplified, economical plastic injection molding methods in molds that do not possess the defects or disadvantages of similar prior art manufacturing methods and molds.

Other objects and advantages of the fishing lures and molding methods and molds incorporating this invention will be found in the specification and claims and the scope of the invention will be set forth in the claims.

DESCRIPTION OF THE DRAWING

FIG. 8 is a fragmentary side view of a schematic representation of another embodiment of the invention.

FIG. 9 is an enlarged cross sectional partial plan view of the embodiment shown in FIG. 8

FIG. 10 is a fragmentary top plan view of a schematic representation of a fish lure made with the embodiment shown if FIGS. 8 and 9.

FIG. 11 is an end view taken generally along the line 11—11 in FIG. 10.

DESCRIPTION OF THE INVENTION

Figure 1:
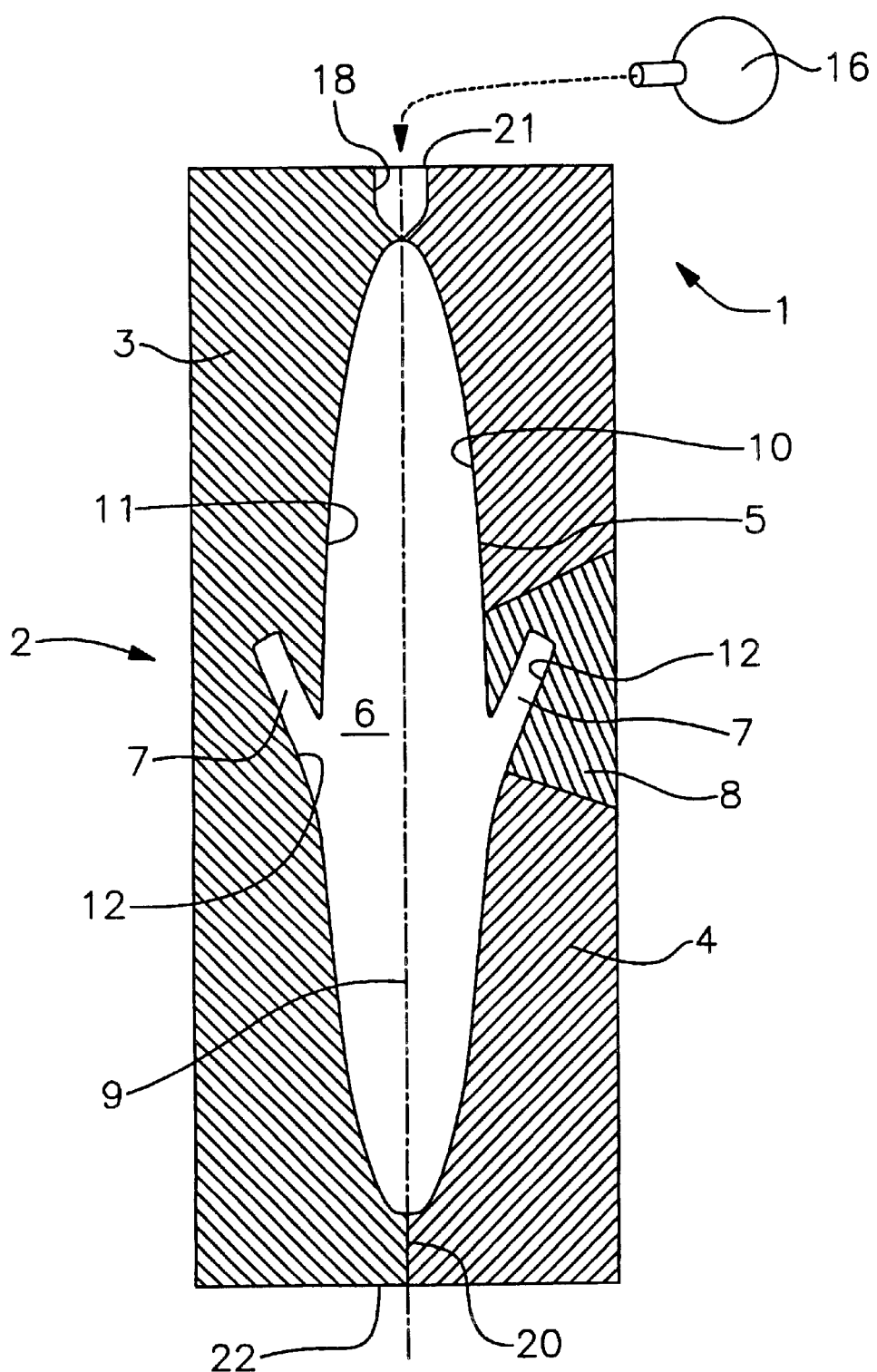
FIG. 1 is a partial cross sectional plan view of a schematic representation of apparatus used to practice this invention.

The drawing shows apparatus 1 for practicing soft plastic fish lure injecting molding methods incorporating this invention. A two piece mold 2 has identical halves 3 and 4 that are mirror images of each other. The mold will cast a unitary or one-piece soft plastic fishing lure 5 having a body portion 6 with integral protruding parts such as soft flexible fins 7 that project at a predetermined angle to the longitudinal central axis 9 of the lure. The halves 3 and 4 will have mirror image cavities 10 and 11 each forming half of the lure body portion 6. Each cavity includes a blind pocket or notch 12 that will define one of the fins 7 of the lure. The notches 12 each have an entrance opening 14 communicating with the cavity 10 or 11 of its mold halve, and a closed terminal end 15. The notches 12 are not vented to the atmosphere by any openings that permit air to escape.

The mold halves 3 and 4 both may be multi-piece units like the halve 4 with slide bar inserts 8 that have the notches 12 cut therein. Inserts 8 may be held in place by clamp means 13, and may be removable to change the size or shape of the fins 7 or if the inserts become worn or damaged. The inserts 8 are trapezoidal in cross section with the longest dimension of their trapezoidal shape being at the outside surface of the mold halve. Alternatively, the mold halves 3 and 4 may be unitary one-piece units like the halve 3 with the notches 12 milled therein.

A conventional source 16 of pressurized molten plastic 17 is connected to the entrance opening or sprue 18 of the mold. The mold halves 3 and 4 may be held together in contact with each other and moved apart during the molding process by any conventional means. The fishing lure 5 may be cast from any suitable soft, supple, flexible, resilient synthetic plastic, such as polyvinyl chloride plasticized with esters such as phathalate.

The molding process begins when the mold 2 is closed with the halves 3 and 4 held tightly against each other in a vertical plane of abutment 20 that includes the axis 9; no part of the notches 12 lies in the plane 20. Molten plastic 17 is forced under pressure from source 16 through entrance gate 18 at the head or front end of the lure 5 and into the mold cavities 10 and 11. As the molten plastic advances from the entrance end 21 of the mold toward the closed other end 22, the pressure on the air in the cavities increases and the air is expelled through the space between the molds in the vertical plane of abutment 20.

Figure 2:
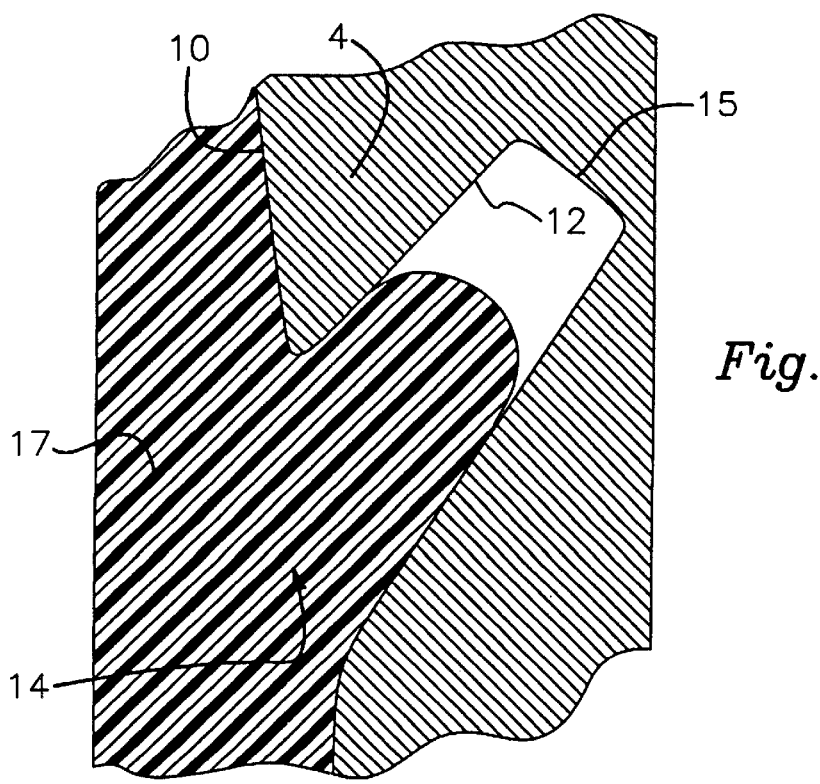
FIG. 2 is an enlarged fragmentary cross sectional plan view of the mold shown in FIG. 1.
Figure 3:
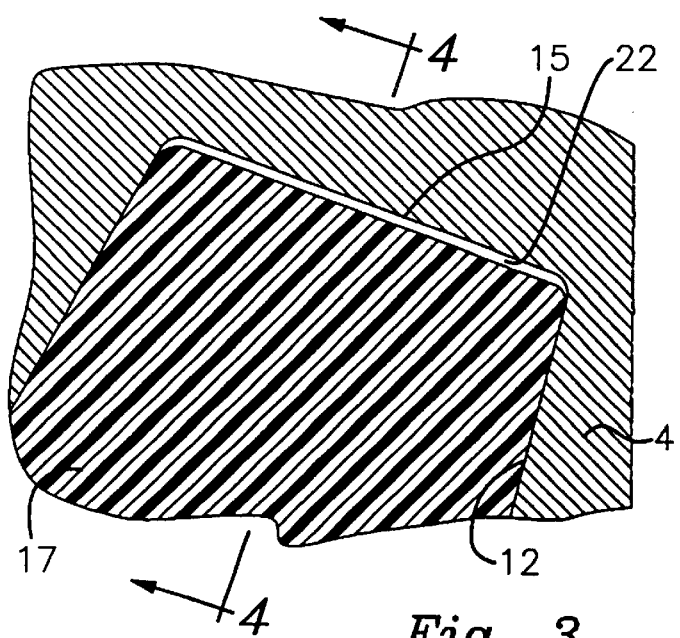
FIG. 3 is an even further enlarged fragmentary cross sectional plan view of the mold in FIG. 1.

As the molten plastic moves along the cavities past the entrance openings 14 of the notches 12, the molten plastic seals off the notches and traps air in the notches, as shown in FIG. 2. The pressurized molten plastic continues to flow through the notches 12 toward the closed terminal ends 15, and this molten plastic flow compress the air that has been trapped in the notches 12 into a single integral bubble that fills the small space 22, as shown in FIG. 3. The pressure of the compressed air will be about the same as the pressure at which the molten plastic is injected into the mold. The pressure of the air compressed in the spaces 21 should be at least about 15–60 psi (pounds per square inch).

Figure 4:
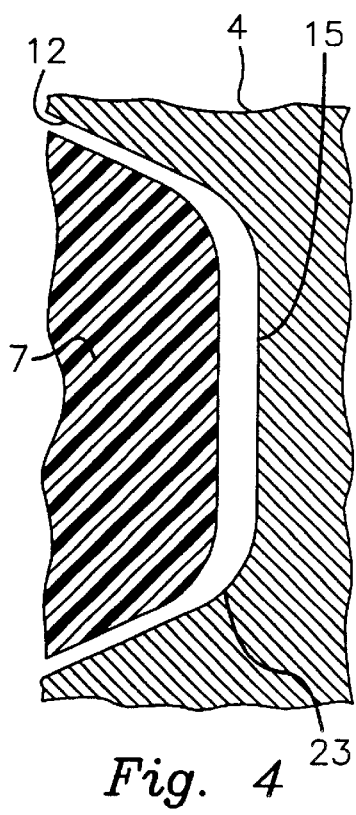
FIG. 4 is a full elevational view taken generally along the line 4—4 in FIG. 3.
Figure 5:
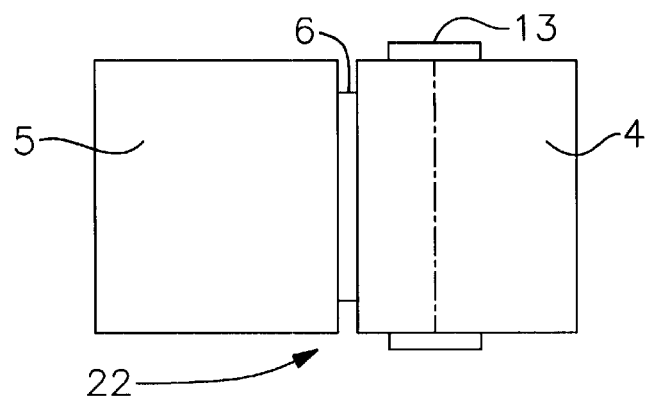
FIG. 5 is an end view of the mold shown in FIG. 1 with the mold halves separated to release the molded fish lure.

The molten plastic is then cooled in any conventional manner, but the air compressed in the space 21 is prevented from escaping from the notches 12 by the plastic filling the rest of the notches and the cavities 10 and 11. After the plastic defining the lure body portion and the fins has solidified, the mold halves are moved apart slightly, as shown in FIG. 5. This relieves the pressure on the body portion, but does not relieve the higher pressure of the air compressed in the spaces 21. The higher pressure of the compressed air is relieved by the compressed air ejecting the fins from the notches as shown in FIG. 4. When the mold halves 3 and 4 are moved sufficiently far apart, the lure will simply fall out of the mold.

As shown in FIG. 4, when viewed in a vertical plane, the curved surfaces 23 of the closed ends 15 of the notches are concave. These concave terminal end surfaces 23 ensure that all of the air that is trapped in the notches 12 by the advancing molten plastic 17 will be compressed into a single integral bubble in the space 21, and that the air will not be separated into several bubbles or mixed with the molten plastic as it advances toward the terminal ends 15. Trapping all of the air as a single bubble in the space 21 ensures that the ends of the fins will not be distorted or malformed by air bubbles, and that there will not be excess scrap that must be trimmed from the fins.

The elimination of vent holes for the air trapped in the fin cavities 12 eliminates the scrap that forms in such vent holes and the worker time required to trim and handle such scrap. By employing the air compressed in the cavities 12 at a pressure great enough to eject the fishing lure 5 from the mold, the expense of mold parting agents and coatings and the time required to apply them is also eliminated. The soft flexible plastic fishing lures 5 molded by this method have fewer manufacturing defects and thus are less expensive and perform better when used by fishermen.

Figure 6:
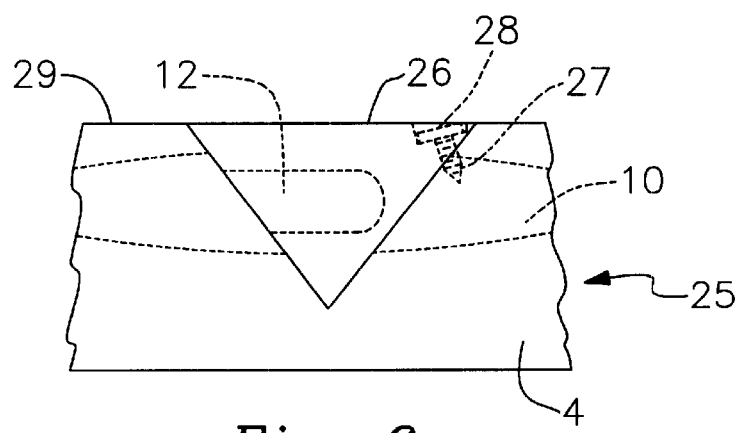
FIG. 6 is a fragmentary side view of a schematic representation of another embodiment of the invention.

FIG. 6 shows another embodiment of a mold 25 in which triangular inserts 26 containing the notches 12 are held in the mold halves 3 and 4 by several suitably placed threaded fasteners 27 which are screwed into holes tapped into the mold halves. The heads 28 of the fasteners should be counter sunk below the inside surface 29 of the mold halves and located outside of the cavities 10 and 11.

Figure 7:
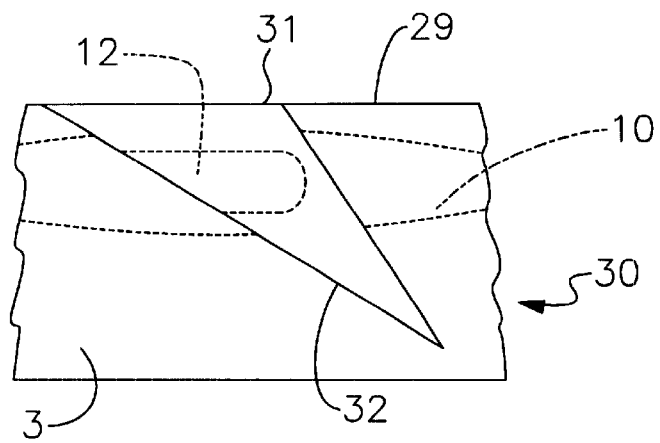
FIG. 7 is a fragmentary side view of a schematic representation of an additional embodiment of the invention.

FIG. 7 shows another embodiment of a mold 30 in which inserts 31 containing the notches 12 are permanently press fit into slots 32 that undercut the inside surface 29 of the mold halves 3 and 4.

FIGS. 8 and 9 show another embodiment of the invention in which the mold halves 3 and 4 are identical to those in the embodiment shown in FIGS. 1–5, except that a gusset hole 34 in each mold halve connects the notches 12 to the main cavity 10 adjacent their entrance openings 14. The molten plastic traps air in the terminal ends 15 of the notches 12 of this embodiment in the same manner described with reference to FIGS. 2–5. The trapped air bubble is compressed to a high enough pressure to eject the lure when the mold halves are moved apart as previously described.

The holes 34 cause a small essentially triangular web of plastic to form into the gussets 35. Each gusset 35 is integral with its associated fin 7 and the adjacent area of the main body portion 6. The gussets 35 may extend for no more than about half of the length of the fins 7, and, as shown in FIG. 11, the gussets are located at essentially the vertical center of the fins. The gussets have a top surface 37 and a bottom surface 38 and these surfaces 37 and 38 are substantially parallel. The vertical thickness of the gussets 35 is only a small fraction (e.g. one-twelfth) of the vertical height of the fins 7, as shown in FIG. 11. The gussets 35 hold the fins 7 at the same predetermined angle 36 (e.g. 20 degrees) with the lure body central axis 20. The gussets 35 ensure that both of the fins 7 will remain at the same predetermined angle when the lure is being moved through the water. This will enable the lure to move in the manner it was designed to wobble in currents of varying speeds and when the lure is retrieved through dense weeds or debris. Strong currents or solids in the water could cause one or both fins 7 to be spread from the lure body at angles greater than the predetermined angle or a fin or fins could be pressed toward the lure body at angles that are too small. Deviation of either fin 7 from the predetermined angle will prevent the lure from achieving the design motion.

While the present invention has been described with reference to particular embodiments and methods, it is not intended to illustrate or describe all of the equivalent forms or ramifications thereof. Also, the words used are words of description rather than limitation, and various changes may be made without departing from the spirit or scope of the invention disclosed herein. It is intended that the appended claim cover all such changes as fall within the true spirit and scope of the invention.

I claim:

1. A unitary artificial soft plastic fishing lure comprising a main body portion having a longitudinal central axis, a pair of integral vertical fins protruding from opposite sides of said main body portion at the same predetermined acute angle to said axis, said fins causing said lure to wobble when the lure is moved through water, a separate gusset integral with each fin and with an area of said main body portion adjacent to each fin where each fin and said main body portion intersect, said gussets immovably holding said fins at said predetermined angle at all times when said lure is wobbling as it is moved through water, each of said gussets being an essentially triangular web of plastic, one side of each triangular web of plastic being integral with its attached fin, an adjacent side of each triangular web of plastic being integral with said area of said main body portion adjacent to its nearest fin, and the vertex of said one side and said adjacent side of each triangular web of plastic being at the intersection of its attached fin and said main body portion said gussets having a top surface and a bottom surface which are substantially parallel.

2. The unitary artificial soft plastic fishing lure defined in claim 1, further comprising each of said gussets extends for no more than about half the length of the fin to which it is attached.

3. The unitary artificial soft plastic fishing lure defined in claim 1, further comprising each of said gussets being located at essentially the vertical center of the fin to which it is attached.

4. The unitary artificial soft plastic fishing lure defined in claim 1, further comprising each of said gussets having a vertical height that is only a small fraction of the vertical height of the fin to which it is attached.

5. The unitary artificial soft plastic fishing lure defined in claim 1, further comprising said gussets being essentially triangular and extending for no more than about half of the length of said fins, said gussets being located at essentially the vertical center of said fins, and said gussets having a vertical height that is only a small fraction of the height of said fins.

6. A unitary artificial fishing lure injection molded from soft plastic comprising a main body portion having a longitudinal central axis, an integral vertical fin protruding from said main body portion said fin intersecting said main body portion at a predetermined acute angle to said longitudinal central axis, said fin causing said lure to wobble when the lure is moved through water, an integral triangular plastic web defining a gusset that connects said fin to said main body portion, one side of said triangular plastic web being integral with said fin, and an adjacent side of said triangular plastic web being integral with an area of said main body portion adjacent to said fin, the vertex of said one side and said adjacent side of said triangular plastic web, being at the intersection of said fin and said main body portion, said gusset, having a top surface and a bottom surface which are substantially parallel said integral triangular plastic web extending for no more than about half the length of said fin, said integral triangular plastic web being located at essentially the vertical center of its attached fin and having a vertical height that is only a small fraction of the height of said fin, and said gusset immovably holding said fin at said predetermined angle at all times when said lure is wobbling as it is moved through water.

7. The unitary artificial fishing lure defined in claim 6, further comprising a pair of integral fins protruding from said main body portion at predetermined angles to said longitudinal central axis, said fins causing said lure to wobble when the lure is moved through water, a pair of integral triangular plastic webs defining a pair of gussets that connect each of said fins to said main body portion, and said gussets immovably holding said fins at said predetermined angles at all times when said lure is wobbling as it is moved through water.

8. The unitary artificial fishing lure defined in claim 7, wherein said fins protrude from said main body portion at the same predetermined angle to said longitudinal axis.

* * * * *